Oct. 16, 1951 P. H. TAYLOR 2,571,307
INFRARED OBJECTIVE LENS
Filed July 3, 1950
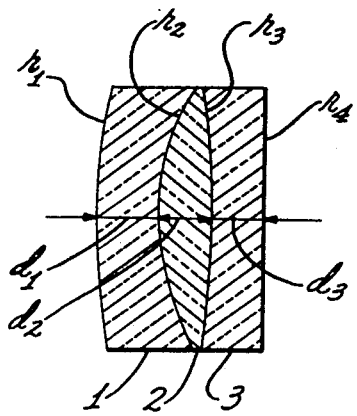
INVENTOR:
PHILIP H. TAYLOR
BY Herbert E. Metcalf
HIS PATENT ATTORNEY Patented Oct. 16, 1951

2,571,307

UNITED STATES PATENT OFFICE 2,571,307

INFRARED OBJECTIVE LENS

Philip H. Taylor, Los Angeles, Calif., assignor to Northrop Aircraft, Inc., Hawthorne, Calif., a corporation of California Application July 3, 1950, Serial No. 171,788

2 Claims. (Cl. 88—57)

This invention relates to a new and improved infrared objective. The lens system is a cemented triplet chromatically corrected for the wavelengths 0.6 micron and 1.0 micron.

It is an object of the present invention to provide an infrared lens system essentially free from spherical aberration, astigmatism, distortion, and fulfilling the sine condition without the use of an air space.

Briefly, the invention includes an optical objective comprising three coaxial cemented components which, from front to rear, are a negative meniscus concave to the rear, a positive meniscus with convex surfaces, and a negative meniscus concave to the front, the objective being chromatically corrected for the wavelengths 0.6 micron and 1.0 micron.

The single figure is a diagram illustrating in axial section a preferred lens assembly according to the present invention. The system comprises two negative lenses, 1 and 3, and one positive lens 2 assembled and cemented into a single unit. The lens illustrated has an aperture of f/10, is 4.0 inches in diameter, and has a 40 inch effective focal length. In the figure, the radii of the three lenses have been indicated as $r_1$, $r_2$, $r_3$ and $r_4$. Lenses 1 and 2 are cemented along $r_2$, and lenses 2 and 3 are cemented along $r_3$.

Construction data for a 4.0 inch cemented triplet of 40 inches' focal length, chromatically corrected for the infrared region in accordance with this invention, is as follows:

| Prescription | Glass | $N_{.6\ micron}$ | $N_{.8\ micron}$ | $N_{1.0\ micron}$ | $V_{.6\ micron,\ 1.0\ micron}$ |
|---|---|---|---|---|---|
| $r_1 = 17.8158$ | | | | | |
| $d_1 = .4000$ | DF-3 | 1.62005 | 1.60936 | 1.60408 | 38.16 |
| $r_2 = 9.3897$ | | | | | |
| $d_2 = .6000$ | BSC-2 | 1.51623 | 1.51070 | 1.50745 | 58.17 |
| $r_3 = 27.9330$ | | | | | |
| $d_3 = .4000$ | DF-3 | | | | |
| $r_4 = 133.7435$ | | | | | |

Where $r$ is the radius length for an element surface;
$d$ is the axial thickness of an element;
$N_{.6\ micron}$ is the index of refraction for a wave length of light equal to .6 microns;
$N_{.8\ micron}$ is the index of refraction for a wave length of light equal to .8 microns;
$N_{1.0\ micron}$ is the index of refraction for a wave length of light equal to 1.0 micron;

$$V_{.6\ micron,\ 1.0\ micron} = \frac{N_{.8\ micron} - 1}{N_{.6\ micron} - N_{1.0\ micron}}$$

$DF$-3 is a dense flint glass;
$BSC$-2 is a borosilicate glass.

The lens aberrations and also the optical tolerances are now given.

(1) $LA'$ $= -.02691$ $\pm .0359$
(2) $LZA'$ $= -.01245$ $\pm .0539$
(3) $OSC'$ $= +.000012$ $\pm .00044$ (empirical tolerance)
(4) $L'Z_{1.0} - L'Z_{.6} = +.00017$ $\pm .0090$
(5) Zonal $g_7$ $= -.00007$ $\pm .00044$ (empirical tolerance)
(6) $Coma'_t$ $= +.0000021$
(7) $Coma'_s$ $= +.0000007$ (extremely sharp definition)
(8) $X'_T$ $= +.01574$
(9) $X'_T \tan U'_m = +.00078$ (extremely sharp definition)
(10) Tang. $LA'$ $= -.02729$ $\pm .0359$
(11) $TADF'$ $= +.00625$
(12) $(TADF') \tan U'_m = +.000310$ (extremely sharp definition)
(13) $X'_t$ $= +.00846$
(14) $X'_t \tan U'_m$ $= +.000419$ (extremely sharp definition)
(15) $X'_s$ $= +.0053$
(16) $Dist'$ $= +.0000062$ .00123% (entirely invisible)

Where $LA'$ is the spherical aberration equal to the back focal length of the paraxial ray minus the back focal length of the marginal ray;

$LZA'$ is the longitudinal zonal aberration;

$OSC'$ is the offense against the sine condition;

$L'Z_{1.0} - L'Z_{.6}$ is the difference in distance of the intersections of the zonal rays on the optical axis of the wavelengths 1.0 and .6 microns;

Zonal $g_7$ is a third order coefficient which is indicative of lateral color error;

$Coma'\ t$ is coma error in the tangential plane;

$Coma'\ s$ is the coma error in the sagittal plane;

$X'_T$ is the distance from a selected focal plane to the focal point of an off axis object in the tangential plane. (A prime always refers to the image space.)

Tan $U'_M$ is one-half the f number;

Tang. $LA'$ is lateral spherical aberration;

$TADF'$ is the true astigmatic difference of focus;

$X'\ t$ is the distance from a selected focal plane to the focal point of an off axis object for the principal ray in the tangential plane;

$X'\ s$ is the distance from a selected focal plane to the focal point of an off axis object for the principal ray in the sagittal plane;

| Prescription | Glass | $N_{.6\,micron}$ | $N_{.8\,micron}$ | $N_{1.0\,micron}$ | $V_{.6\,micron,\,1.0\,micron}$ |
|---|---|---|---|---|---|
| $r_1 = 17.8158$ $d_1 = .4000$ $r_2 = 9.3897$ $d_2 = .6000$ $r_3 = -27.9330$ $d_3 = .4000$ $r_4 = -133.7435$ | DF-2 BSC-2 DF-3 | 1.62005 1.51623 | 1.60936 1.51070 | 1.60408 1.50745 | 38.16 58.17 |

Dist' is the measure of distortion.

The prescription given above can easily be varied to suit various purposes as may be desired, by a simple scaling procedure.

When the radii, thicknesses and diameters of the component lenses, for example, are each multiplied by a constant, and when the effective focal length, the back focal length, the linear size of the field, and the aberrations of the original system are multiplied by the same constant, precise values for the new system will be obtained. It is to be carefully noted that speed (or f/no.) and angular size of the field are not changed. Neither are the optical tolerances changed. It therefore follows that if a system of given focal length performs satisfactorily, its optical behavior can always be improved by constructing a smaller scale model. Should a larger scale model be desired, consideration must be given to the ratio each aberration bears to its tolerance in the original prescription, since this ratio is subject to multiplication by the scaling constant.

Having thus described and illustrated this invention, it is claimed:

1. An infrared objective comprising three coaxially cemented components which numbering from front to rear is first a negative meniscus concave to the rear, the second is positive with convex surfaces, and the third is a negative meniscus concave to the front, said objective having the following prescription:

Where
 $r$ is the radius length for an element surface;
 $d$ is the axial thickness of an element;
 $N_{.6\,micron}$ is the index of refraction for a wavelength of light equal to .6 micron;
 $N_{.8\,micron}$ is the index of refraction for a wavelength of light equal to .8 micron;
 $N_{1.0\,micron}$ is the index of refraction for a wavelength of light equal to 1.0 micron;

$$V_{.6\,micron,\,1.0\,micron} = \frac{N_{.8\,micron}-1}{N_{.6\,micron}-N_{1.0\,micron}}$$

DF-3 is a dense flint glass;
BSC-2 is a borosilicate glass.

2. An objective scaled from the prescription of claim 1 by multiplying the radii, thicknesses and diameters of the component lenses, the effective focal length, and the linear size of the field of said objective each by a constant K differing from zero.

PHILIP H. TAYLOR.

REFERENCES CITED

The following references are of record in the file of this patent:

UNITED STATES PATENTS

| Number | Name | Date |
|---|---|---|
| 415,040 | Hastings | Nov. 12, 1889 |
| 1,293,086 | Graf | Feb. 4, 1919 |
| 2,085,437 | Michelssen | June 29, 1937 |

FOREIGN PATENTS

| Number | Country | Date |
|---|---|---|
| 847,600 | France | July 3, 1939 |
| 895,403 | France | Apr. 3, 1944 |